(12) United States Patent
Chapman et al.

(10) Patent No.: US 7,739,287 B1
(45) Date of Patent: Jun. 15, 2010

(54) SYSTEM AND METHOD FOR DYNAMICALLY CREATING KEYS IN A DATABASE SYSTEM

(75) Inventors: Richard K. Chapman, Boca Raton, FL (US); David A. Bayliss, Delray Beach, FL (US); Gavin C. Halliday, Royston (GB); Nigel G. Hicks, London (GB); Ole D. Poulsen, Bend, OR (US); Jacob Cobbett-Smith, London (GB)

(73) Assignee: Seisint, Inc., Boca Raton, FL (US)

( * ) Notice: Subject to any disclaimer, the term of this patent is extended or adjusted under 35 U.S.C. 154(b) by 303 days.

(21) Appl. No.: 10/866,616

(22) Filed: Jun. 11, 2004

(51) Int. Cl.
*G06F 7/00* (2006.01)
*G06F 17/30* (2006.01)
(52) U.S. Cl. ................. 707/741; 707/744; 707/751; 707/999.002
(58) Field of Classification Search .............. None
See application file for complete search history.

(56) References Cited

U.S. PATENT DOCUMENTS

| | | | |
|---|---|---|---|
| 4,543,630 A | 9/1985 | Neches | |
| 5,301,333 A | 4/1994 | Lee | |
| 5,349,682 A | 9/1994 | Rosenberry | |
| 5,418,937 A | 5/1995 | Inoue | |
| 5,437,032 A | 7/1995 | Wolf et al. | |
| 5,504,886 A | 4/1996 | Chang et al. | |
| 5,515,531 A | 5/1996 | Fujiwara et al. | |
| 5,551,027 A | 8/1996 | Choy et al. | |
| 5,675,742 A | 10/1997 | Jain et al. | |
| 5,717,911 A | * 2/1998 | Madrid et al. ................. 707/2 |
| 5,752,031 A | 5/1998 | Cutler et al. | |
| 5,857,180 A | 1/1999 | Hallmark et al. | |
| 6,038,563 A | 3/2000 | Bapat et al. | |
| 6,092,062 A | * 7/2000 | Lohman et al. ................ 707/2 |

(Continued)

OTHER PUBLICATIONS

System and Method for Pre-Compiling a Query and Pre-Keying a Database System, by Richard K. Chapman, et al., U.S. Appl. No. 10/866,270, Pending, 79 pages, filed Jun. 11, 2004.

(Continued)

*Primary Examiner*—John R. Cottingham
*Assistant Examiner*—Mariela D Reyes
(74) *Attorney, Agent, or Firm*—Finnegan, Henderson, Farabow, Garrett & Dunner LLP

(57) ABSTRACT

A database system capable of dynamically creating one or more keys associated with one or more pre-compiled queries includes a plurality of slave nodes that are operable to execute one or more pre-compiled queries. Each of the plurality of slave nodes operates to store one or more usage statistics that relate to the execution of the one or more pre-compiled queries. The system also includes at least one master node that is coupled to each of the plurality of slave nodes. The at least one master node is operable to receive the one or more usage statistics from each of the plurality of slave nodes. Furthermore, the at least one master node is operable to identify, based at least in part on the one or more usage statistics, one or more keys to dynamically create. Moreover, each of the plurality of slave nodes dynamically creates the one or more keys for use in executing the one or more pre-compiled queries.

33 Claims, 5 Drawing Sheets

U.S. PATENT DOCUMENTS

| | | | |
|---|---|---|---|
| 6,144,992 | A | 11/2000 | Turpin et al. |
| 6,351,742 | B1* | 2/2002 | Agarwal et al. ............... 707/3 |
| 6,438,537 | B1* | 8/2002 | Netz et al. ..................... 707/3 |
| 6,438,562 | B1 | 8/2002 | Gupta et al. |
| 6,449,356 | B1 | 9/2002 | Dezonno |
| 6,505,205 | B1 | 1/2003 | Kothuri et al. |
| 6,546,403 | B1 | 4/2003 | Carlson, Jr. et al. |
| 6,694,337 | B1 | 2/2004 | King et al. |
| 6,886,046 | B2 | 4/2005 | Stutz et al. |
| 6,993,774 | B1 | 1/2006 | Glass |
| 7,007,070 | B1 | 2/2006 | Hickman |
| 7,054,910 | B1 | 5/2006 | Nordin et al. |
| 7,158,975 | B2 | 1/2007 | Mazzagatti |
| 2001/0053957 | A1 | 12/2001 | Blair et al. |
| 2002/0065884 | A1 | 5/2002 | Donoho et al. |
| 2002/0138582 | A1 | 9/2002 | Chandra et al. |
| 2002/0143755 | A1 | 10/2002 | Wynblatt et al. |
| 2002/0152188 | A1 | 10/2002 | Crus et al. |
| 2002/0184314 | A1 | 12/2002 | Riise |
| 2003/0018645 | A1 | 1/2003 | Kong |
| 2003/0069923 | A1 | 4/2003 | Peart |
| 2003/0078858 | A1 | 4/2003 | Angelopoulos et al. |
| 2003/0200282 | A1* | 10/2003 | Arnold et al. ............... 709/219 |
| 2003/0220941 | A1* | 11/2003 | Arnold et al. ............... 707/200 |
| 2004/0088294 | A1 | 5/2004 | Lerhaupt |
| 2004/0098370 | A1 | 5/2004 | Garland et al. |
| 2004/0098390 | A1 | 5/2004 | Bayliss et al. |
| 2004/0143644 | A1 | 7/2004 | Berton et al. |
| 2004/0162822 | A1 | 8/2004 | Papanyan et al. |
| 2004/0204988 | A1 | 10/2004 | Willers et al. |
| 2004/0260685 | A1* | 12/2004 | Pfleiger et al. ................. 707/3 |
| 2004/0267719 | A1 | 12/2004 | Doherty et al. |
| 2005/0187977 | A1 | 8/2005 | Frost |

OTHER PUBLICATIONS

System and Method for Processing Query Requests in a Database System, by Richard K. Chapman, et al., U.S. Appl. No. 10/866,204, Pending, 122 pages, filed Jun. 11, 2004.

System and Method for Processing a Request to Perform an Activity Associated with a Precompiled Query, by Richard K. Chapman, et al., U.S. Appl. No. 10/866,565, Pending, 123 pages, filed Jun. 11, 2004.

System and Method for Returning Results of a Query from One or More Slave Nodes to One or More Master Nodes of a Database System, by Richard K. Chapman, et al., U.S. Appl. No. 10/866,456, Pending, 120 pages, filed Jun. 11, 2004.

System and Method for Enhancing Sysem Reliability using Multiple Channels and Multicast, by Richard K. Chapman, et al., U.S. Appl. No. 10/866,604, Pending, 79 pages, filed Jun. 11, 2004.

System and Method for using Activity Identifications in a Database System, by Richard K. Chapman, et al., U.S. Appl. No. 10/865,954, Pending, 79 pages, filed Jun. 11, 2004.

System and Method for Distributing Data in a Parallel Processing System, by Richard K. Chapman, et al., U.S. Appl. No. 10/866,620, Pending, 79 pages, filed Jun. 11, 2004.

System and Method for Managing Throughout in the Processing of Query Requests in a Database System, by Richard K. Chapman, et al., U.S. Appl. No. 10/866,394, Pending, 122 pages, filed Jun. 11, 2004.

Avi Kavas et al., "Using multicast to pre-load jobs on the ParPar cluster," Feb. 2001; Parallel Computing, vol. 27, Issue 3, pp. 315-327.

Liu, Ling, "Query Routing in Large-scale Digital Library Systems", Data Engineering, 1999 Proceedings, 15th International conference on Sydney, NSW, Australia, Mar. 23-26, 1999, Los Alamitos, CA, USA, IEEE Computer Society, Mar. 23, 1999, pp. 154-163.

Bonnet et al., "Query Processing in a Device Database System", Cornell University, Technical Report: TR99-1775, Oct. 1999, 26 pages.

* cited by examiner

FIG. 4

| | PARAMETER A | PARAMETER B | PARAMETER C | PARAMETER D | PARAMETER E | PARAMETER F | PARAMETER G |
|---|---|---|---|---|---|---|---|
| 430₁ | FORD | MUSTANG | 1967 | RED | BILL | JONES | FLORIDA |
| 430₂ | NISSAN | MAXIMA | 2004 | WHITE | JAMES | ABLE | CALIFORNIA |
| 430₃ | LEXUS | IS 300 | 2002 | SILVER | FRANK | TOMS | TEXAS |
| | ... | ... | ... | ... | ... | ... | ... |
| 430ₙ | PONTIAC | AZTEC | 2001 | ORANGE | ERIC | BAKER | ALABAMA |

534a

| 502 | 504 | 506 |
|---|---|---|
| PARAMETER C | PARAMETER A | POINTER |
| 2004 | ACURA | 1269 |
| 2004 | ACURA | 3451 |
| ... | ... | ... |
| 1958 | VOLVO | 6237 |

534b

| 508 | 510 | 512 |
|---|---|---|
| PARAMETER B | PARAMETER D | POINTER |
| ACCLAIM | BLUE | 9763 |
| ACCLAIM | GREEN | 4317 |
| ... | ... | ... |
| Z8 | WHITE | 2491 |

| 514 | 516 | 518 |
|---|---|---|
| PARAMETER G | PARAMETER C | POINTER |
| ARIZONA | 2004 | 6854 |
| ARIZONA | 2004 | 5162 |
| ... | ... | ... |
| WYOMING | 1962 | 7992 |

534d

| 520 | 522 | 524 |
|---|---|---|
| PARAMETER B | PARAMETER C | POINTER |
| Z8 | 2003 | 8517 |
| Z8 | 2003 | 1123 |
| ... | ... | ... |
| ACCLAIM | 1994 | 4156 |

*FIG. 5B*

SYSTEM AND METHOD FOR DYNAMICALLY CREATING KEYS IN A DATABASE SYSTEM

TECHNICAL FIELD OF THE INVENTION

This invention relates in general to computing systems, and more particularly to a system and method for dynamically creating keys in a database system.

Overview

Conventional relational database systems are often capable of storing, organizing, and/or processing large amounts of data. As an example, relational database systems may be capable of storing, organizing, and/or processing many millions or billions of records. In these systems, data organization is vital to the processing efficiency of the database system. Data organization within the relational database system is particularly important in relational database systems that execute relatively complex queries and other commands involving relatively large amounts of data.

In a typical relational database system, relationships are used to break down the data into simpler structures for storage in one or more data-storage devices. As a result, related information may be stored and distributed over multiple data-storage devices. In most cases, before a relational database system can process a query, the relational database system must redistribute the data so that it may be processed and/or correlated according to the received query.

SUMMARY OF EXAMPLE EMBODIMENTS

According to a system embodiment, a database system capable of dynamically creating one or more keys associated with one or more pre-compiled queries comprises a plurality of slave nodes that are operable to execute one or more pre-compiled queries. Each of the plurality of slave nodes operates to store one or more usage statistics that relate to the execution of the one or more pre-compiled queries. The system also comprises at least one master node that is coupled to each of the plurality of slave nodes. The at least one master node is operable to receive the one or more usage statistics from each of the plurality of slave nodes. Furthermore, the at least one master node is operable to identify, based at least in part on the one or more usage statistics, one or more keys to dynamically create. In one particular embodiment, each of the plurality of slave nodes dynamically creates the one or more keys for use in executing the one or more pre-compiled queries.

According to one exemplary method of forming the present invention, a method of dynamically creating one or more keys for use on a database system comprises storing one or more usage statistics associated with one or more pre-compiled queries that are executed on each of a plurality of slave nodes. The method also comprises collecting, from each of the plurality of slave nodes, the one or more usage statistics associated with the one or more pre-compiled queries. The method further comprises at each of the plurality of slave nodes, dynamically creating one or more keys for use in executing the one or more pre-compiled queries. The dynamic creation of the one or more keys is based at least in part on the collection of the one or more usage statistics.

Depending on the specific features implemented, particular embodiments of the present invention may exhibit some, none, or all of the following technical advantages. Various embodiments may be capable of improving the processing efficiency of a database system. Some embodiments may be capable of improving reliability by providing redundancy that can reduce the effects of a single failure of a database system.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which:

FIG. 4 is one embodiment of a table that includes a plurality of rows;

FIGS. 5A and 5B are example embodiments of a plurality of keys associated with a table hat were dynamically created by a database system.

DETAILED DESCRIPTION OF EXAMPLE EMBODIMENTS

Figure 1:
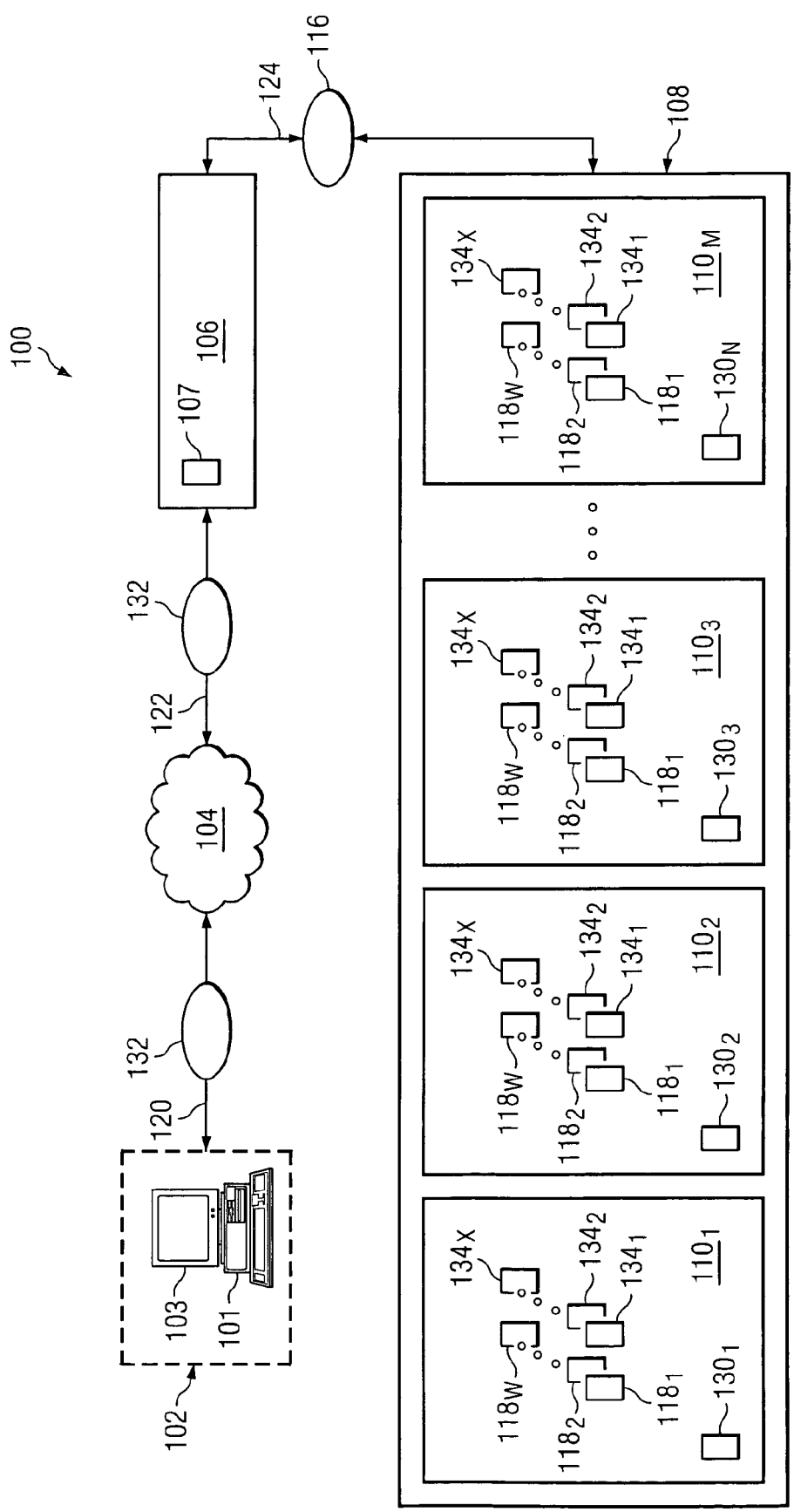
FIG. 1 is a block diagram of one embodiment of a database system capable of deploying a pre-compiled query and dynamically creating keys associated with a pre-compiled query.

FIG. 1 is a block diagram of one embodiment of a database system 100 capable of deploying a pre-compiled query 118 and dynamically creating keys associated with pre-compiled query 118. FIG. 1 illustrates just one example embodiment of system 100. It should be appreciated that other embodiments of system 100 may be used without departing from the scope of the present disclosure. As used throughout this document, the term "pre-compiled query" refers to a query that has been deployed on a database system in advance of a user executing such query on such database system.

In this example, system 100 includes a database system 108 capable of performing one or more desired computing and/or communicating functions. For example, database system 108 may be capable of storing, organizing, sorting, processing, correlating, and/or communicating data associated with one or more data files. In addition, database system 108 may be capable of, for example, storing, processing, keying, and/or executing one or more pre-compiled queries. Database system 108 may comprise any device or combination of devices that may include one or more hardware, software, and/or firmware modules.

In this example, database system 108 comprises a parallel-processing database that includes a plurality of nodes $110_1$-$110_M$ capable of storing, organizing, correlating, processing, distributing, and/or manipulating data. In various embodiments, each of nodes 110 can comprise or have access to, for example, one or more processor modules, one or more memory modules, and/or one or more software modules. In some embodiments, each of nodes 110 can comprise, for example, a master node, a slave node, one or more memory modules, or a combination of these or other devices.

In this particular embodiment, database system 108 stores data associated with one or more data files in tables that are distributed over nodes $110_1$-$110_M$. As used throughout this document, the term "table" refers to any data structure, arrangement, or compilation of information. In this example, each table includes a plurality of rows $130_1$-$130_N$ that are distributed over a plurality of nodes $110_1$-$110_M$. In some embodiments, each table may include a plurality of rows $130_1$-$130_M$ that can be evenly distributed over at least some of nodes $110_1$-$110_M$.

In some embodiments, database system 108 may include one or more processors capable of managing the organization of the stored data and coordinating the retrieval of the data from nodes $110_1$-$110_M$ in response to queries, commands, and/or requests received by database system 108. In various embodiments, database system 108 can receive requests, commands, and/or queries in a standard format, such as, for example, structured query language (SQL), extensible markup language (XML), hypertext markup language (HTML), or any other desired format. In other embodiments, database system 108 may include one or more processors capable of coordinating the retrieval of data from another source, such as, for example, another database system, a web site, or any other device or entity capable of storing data.

In this example, a client 102 couples to system 100 through a network 104. Client 102 may include any computing and/or communication device operable to communicate and/or receive information. For example, each client 102 may include a web server, a work station, a mainframe computer, a mini-frame computer, a desktop computer, a laptop computer, a personal digital assistant, a wireless device, and/or any other computing or communicating device or combination of devices. In operation, client 102 may execute with any of the well-known MS-DOS, PC-DOS, OS-2, MAC-OS, WINDOWS™, LINUX, UNIX, or other appropriate operating systems.

In this particular embodiment, client 102 includes a query building module 101 and a graphical user interface (GUI) 103 that enable a user to display, create, retrieve, and/or amend queries for use by system 100. In some cases, query building module 101 and/or GUI 103 can allow a user to identify one or more combinations of variables to be used in processing the query and/or to be used in organizing data for processing the query. In various embodiments, query building module 101 and GUI 103 enable a user to create and/or amend a query that is capable of resolving future and/or routine data requests on system 108. For example, a user of client 102 can create and/or amend a query that returns one or more desired address or range of addresses when any combination of one or more first names, one or more last names, or one or more social security numbers are supplied in a request to system 108. That is, when any of the plurality of variables is supplied in a request to system 108, the query enables system 108 to provide the appropriate address or addresses as an output.

In other embodiments, query building module 101 and GUI 103 enable/a user to create and/or amend a query that is capable of returning any one of a plurality of desired responses or ranges of responses. In other words, when any of the plurality of variables is supplied in a request to database system 108, the query enables system 108 to provide any one of a plurality of desired outputs or ranges of desired outputs. In one non-limiting example, a user of client 102 can create and/or amend a query that that enables a user of system 108 to input any combination of variables, and return one or more desired responses or ranges of responses. For example, a user of client 102 can create and/or amend a query that returns all vehicle owners having a specific first name, such as Richard, when any combination of one or more years a vehicle was produced, one or more vehicle makes, one or more vehicle models, one or more vehicle colors, one or more states of vehicle registration, one or more vehicle suggested retail prices, and one or more zip codes that a vehicle was sold in of vehicle is supplied in a request to system 108.

In various embodiments, query building module 101 and/or GUI 103 may enable a user of client 102 to create and/or amend a desired query using one or more query programming languages. The programming language can comprise, for example, C++, Enterprise Control Language (ECL), Structured Query Language (SQL), Perl, or a combination of these or other programming languages. In some cases, a user of client 102 can input one or more programming instructions associated with the query programming language to create and/or amend a desired query using query building module 101 and/or GUI 103.

Query building module 101 can comprise any device or combination of devices that may include one or more hardware, software, and/or firmware modules. In various embodiments, query building module 101 may comprise, for example, software capable of being executed on client 102. In other embodiments, query building module 101 may comprise the necessary hardware, software, and/or firmware capable of providing an extensible markup language (XML) or hypertext markup language (HTML) template for display on GUI 103.

In this example, client 102 generates a representation 132 of the query created and/or amended by the user of client 102. In some embodiments, query representation 132 can include and/or identify one or more combinations of variables to be used in processing the query and/or organizing data for processing the query. In this particular embodiment, query representation 132 comprises an HTML document that represents a query that is capable of resolving future and/or routine data requests on system 108. In other embodiments, query representation 132 could comprise, for example, an XML document, a text file, or any other representation of the desired query.

In this example, client 102 communicates query representation 132 to a query module 106. Network 104 couples to client 102 through communications link 120, to query module 106 through communications link 122. As used throughout this document, the term "couple" and/or "coupled" refers to any direct or indirect communication between two or more elements, whether or not those elements are in physical contact with one another.

Network 104 may comprise any wireless network, wireline network, or combination of wireless and wireline networks capable of supporting communication between network elements using ground-based and/or space-based components. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations.

In this example, query module 106 operates to convert, process, compile, and/or configure query representation 132 for use by system 108. Query module 106 can comprise any device or combination of devices that may include one or more hardware, software, and/or firmware modules. In various embodiments, query module 106 can operate to process query representation using, for example, Simple Object Access Protocol (SOAP).

In some embodiments, query module 106 can operate to convert query representation 132 into intermediary source code, such as, for example, source code segment structured in C, C++, Fortran, Pascal, and/or any other appropriate programming language. In other embodiments, query module 106 can operate to convert query representation 132 into a query execution graph representing a series of actions associated with the desired query. In some cases, query module 106 has access to and/or includes a programming language compiler, such as an ECL compiler, that converts query representation 132 into intermediary source code and/or a query execution graph. In those cases, the programming language compiler may be capable of mapping each action associated with the query execution graph to portions of the intermediary source code and/or one or more data files or tables associated with the respective activity.

In this particular embodiment, query module 106 converts query representation 132 into intermediary source code and a query execution graph, and compiles the intermediary source code to generate one or more executables in machine-level code. In some cases, query module 106 has access to and/or includes a programming language compiler, such as a C++ compiler, that converts the intermediate source code into the one or more executables. In various embodiments, the one or more executables can comprise, for example, dynamically-linked executables, fully-linked executables, or a shared library. In this example, the one or more executables comprise dynamic link libraries (DLL) that are capable of being executed dynamically, in whole or in part, by other executables.

In this particular embodiment, query module 106 includes a configuration tool 107 that annotates each action associated with the query execution graph and maps each action to one or more DLL's and/or data files or tables associated with the respective action. In various embodiments, configuration tool 107 can create one or more helper files capable of assisting in the processing of the annotated execution graph. In some cases, the one or more helper files can, for example, identify the appropriate DLL's and/or data files or tables for processing a particular action associated with the annotated query execution graph. In other embodiments, configuration tool 107 can identify one or more combinations of variables to be used in processing the annotated query execution graph and/or organizing data for processing annotated query execution graph. In those cases, configuration tool 107 can communicate such combinations of variables to database system 108 and/or another device or entity for processing. Configuration tool 107 can comprise any device or combination of devices that may include one or more hardware, software, and/or firmware modules.

In some embodiments, configuration tool 107 can assign a unique identification to each action when forming the annotated query execution graph. For example, if the query execution graph associated with query representation 132 includes an index read, configuration tool 107 would assign a unique identification number associated with each action of the index read. In some cases, configuration tool 107 can map each unique identifier to one or more DLL's capable of performing the one or more actions associated with the unique identifier.

In various embodiments, configuration tool 107 can map the unique identifier to a data file or table location within a database or system coupled to query module 106. In those cases, configuration tool 107 may include or have access to a table or index that identifies the location and/or content of data files or tables stored within or accessible to system 100. In this example, configuration tool 107 generates a compiled query 116 that includes an annotated query execution graph, one or more DLL's, and one or more helper files that are capable of resolving future and/or routine data requests on system 108.

In this example, query module 106 communicates compiled query 116 to database system 108 through a communications link 124. Compiled query 116 may comprise, for example, software, code, portions of code, data compilations, and/or a combination of these or any other type of data or executables. In this example, compiled query 116 comprises an annotated query execution graph, one or more DLL's, and one or more helper files capable of resolving future and/or routine data requests on system 108.

In various embodiments, database system 108 operates to deploy compiled query 116 on at least one of nodes 110 as a pre-compiled query 118. In other embodiments, database system 108 operates to deploy compiled query 116 on each of nodes $110_1$-$110_M$. In this particular example, compiled query 116 is deployed on node $110_1$ as pre-compiled query 118. In that example, node $110_1$ distributes a copy of pre-compiled query 118 to each of nodes $110_2$-$110_M$. Although compiled query 116 is deployed to node $110_1$ in this example, compiled query 116 can be deployed to any or all of nodes $110_1$-$110_M$ without departing from the scope of the present disclosure.

In some embodiments, query module 106 can also communicate a request to database system 108 to perform the necessary computing functions necessary to identify and/or retrieve data that is capable of resolving one or more portion of pre-compiled query 118. In other embodiments, database system 108 can identify and/or retrieve data necessary to resolve at least a portion of pre-compiled query 118 and store the data in one or more tables that are distributed over nodes $110_1$-$110_M$. In various embodiments, database system 108 processes the request, identifies data necessary to resolving one or more portions of pre-compiled query 118, and creates one or more tables that include the data and/or variables necessary to resolve pre-compiled query 118. In some cases, each table includes a plurality of rows $130_1$-$130_N$ that can be distributed approximately evenly over a plurality of nodes $110_1$-$110_M$.

In this particular embodiment, node $110_1$ operates to read the annotated query execution graph associated with pre-compiled query 118 and identify one or more data files or tables necessary to satisfy a particular action of pre-compiled query 118. Although node $110_1$ operates to read the query execution graph and identify one or more data files or tables in this example, any or all of node $110_1$-$110_M$ can perform the desired functions without departing from the scope of the present disclosure. In some cases, node $110_1$ can identify the one or more data files or tables using the mapping of each action to the one or more DLL's and/or data files or tables created by configuration tool 107. In other cases, node $110_1$ can identify the one or more data files or tables using the one or more helper files associated with pre-compiled query 118. In various embodiments, node $110_1$ may be capable of generating and/or communicating one or more data requests to acquire the necessary data from its permanent location, such as, for example a database system coupled to system 108.

In this example, node $110_1$ of database system 108 communicates one or more requests to acquire the necessary data from another database system coupled to database system 108. In other embodiments, node $110_1$ of database system 108 can communicate one or more requests to other entities that contain the necessary data. In this example, the other database system 112 receives and processes the one or more requests to communicate data necessary to resolve pre-compiled query 118. The other database system then operates to communicate a copy of the data to database system 108.

In this example, database system 108 receives the data and performs the computing functions necessary to organize the data capable of resolving one or more portions of pre-compiled query 118. In some embodiments, database system 108 can organize the data such that database system 108 stores the data in one or more tables that are distributed over nodes $110_1$-$110_M$. In this particular embodiment, database system 108 creates one or more tables that include the data and/or variables necessary to resolve pre-compiled query 118. In this example, each table includes a plurality of rows $130_1$-$130_N$ that are distributed approximately evenly over a plurality of nodes $110_1$-$110_M$.

In one non-limiting example, database system 108 can create a vehicle identification table that includes a plurality of variables, such as a year a vehicle was produced, a vehicle make, a vehicle model, a vehicle color, a state of vehicle registration, a vehicle suggested retail price, a zip code that a vehicle was sold, a first name of a vehicle owner, a last name of a vehicle owner, and an address of a vehicle owner. In that example, database system 108 distributes the rows associated with the vehicle identification table over nodes $110_1$-$110_M$. In some cases, database system 108 can distribute the rows associated with the vehicle registration table approximately evenly over at least some of nodes $110_1$-$110_M$.

In some embodiments, one or more of nodes $110_1$-$110_M$ may store more than one row 130. In various embodiments, each of rows $130_1$-$130_N$ may be stored on more than one of nodes $110_1$-$110_M$. One aspect of this disclosure recognizes that, in certain embodiments, storing copies of each row 130 on multiple nodes 110 enhances the systems reliability by providing redundancy which can minimize the effects of a single failure of a node 110 on database system 108.

In this particular embodiment, each of nodes $110_1$-$110_M$ is capable of dynamically creating one or more keys $134_1$-$134_X$ for use by system 108 in processing one or more requests to execute one or more pre-compiled queries $118_1$-$118_W$. As used in this document, the phrase "dynamically creating" or "dynamically create" refers to the formation of one or more keys for use by one or more pre-compiled queries while a database system is capable of processing such pre-compiled queries. In some embodiments, each of nodes $110_1$-$110_M$ can dynamically create one or more keys $134_1$-$134_X$ in response to database system 108 executing a particular pre-compiled query 118 a number of times. For example, each of nodes $110_1$-$110_M$ can dynamically create one or more keys $134_1$-$134_X$ after the particular pre-compiled query 118 was executed five times, fifty times, two-hundred times, or more. In other embodiments, each of nodes $110_1$-$110_M$ can dynamically create one or more keys $134_1$-$134_X$ after executing one or more pre-compiled queries $118_1$-$118_W$ for a period of time. For example, each of nodes $110_1$-$110_M$ can dynamically create one or more keys $134_1$-$134_X$ after executing one or more pre-compiled queries $118_1$-$118_W$ for three minutes, one hour, one day, a week, or any other appropriate period of time.

In this particular embodiment, each of keys $134_1$-$134_X$ operates to identify a location of data necessary to resolve one or more requests received from a user of system 108. In some cases, each of keys $134_1$-$134_X$ can operate to identify a location external to system 108. In other cases, each of keys $134_1$-$134_X$ can operate to identify a location within a particular node 110. In some embodiments, each of keys $134_1$-$134_X$ may be capable of identifying the memory address of data capable assisting in the resolution of a particular request. In some cases, the memory address can be associated with a particular node 110.

One aspect of this disclosure recognizes that dynamically creating keys 134 for one or more particular pre-compiled queries can improve the processing efficiency of system 108. In some cases, creating one or more keys for one or more particular pre-compiled queries in advance of a user requesting the execution of such queries may be impracticable. That is, where one or more particular pre-compiled queries include a large number of variables (e.g., seven variables) and/or a user cannot predict combinations likely to be used in requesting execution of such queries, then to satisfy such queries a system administrator would need to create a large number of keys (e.g. seven factorial) to resolve all possible combinations. Creating a large number of keys for particular pre-compiled queries can cause a strain on memory resources associated with the database system. Consequently, dynamically creating one or more keys can alleviate the strain on the memory resources, while improving the processing efficiency of the system.

In various embodiments, each of keys $134_1$-$134_X$ can be created from usage statistics associated with the requests received by system 108 and one or more pre-compiled queries 118 during a specified period. In some cases, the usage statistics can identify the variables provided in each request to execute a particular pre-compiled query 118. In other cases, the usage statistics can identify the combinations of variables most practiced or used during execution of each pre-compiled query 118. In this example, nodes $110_1$-$110_M$ create and maintain two keys 134 having the most used or practiced combinations of variables during a specified period. Thus, each of nodes $110_1$-$110_M$ operates to maintain the currently most used or practiced combinations of variables as keys $134_1$-$134_X$. Although this example creates and maintains only the two keys 134 for each of the most used or practiced combinations of variables, any other number of keys may be created and maintained without departing from the scope of the present disclosure. In various embodiments, each of keys $134_1$-$134_X$ can be used in resolving more than one pre-compiled query 118.

In the illustrated embodiment, system 100 includes at least communication links 120, 122, and 124 each operable to facilitate the communication of data and/or queries within system 100. Communications links 120, 122, and 124 may include any hardware, software, firmware, or combination thereof. In various embodiments, communications links 120, 122, and 124 may comprise communications media capable of assisting in the communication of analog and/or digital signals. Communications links 120, 122, and 124 may, for example, comprise a twisted-pair copper telephone line, a fiber optic line, a Digital Subscriber Line (DSL), a wireless link, a USB bus, a PCI bus, an ethernet interface, or any other suitable interface operable to assist in the communication within system 100.

Although the formation of rows $130_1$-$130_N$ associated with a table has been described in a particular manner, the present disclosure contemplates forming one or more tables having rows $130_1$-$130_N$ in any suitable manner, according to particular needs. As just one example, one or more tables having rows $130_1$-$130_N$ may be dynamically created as one or more query requests are received by database system 108, from client 102. Furthermore, the present invention contemplates database system 108 acquiring the data that is to be the subject of precompiled queries 118 from any suitable source, according to particular needs.

Figure 2:
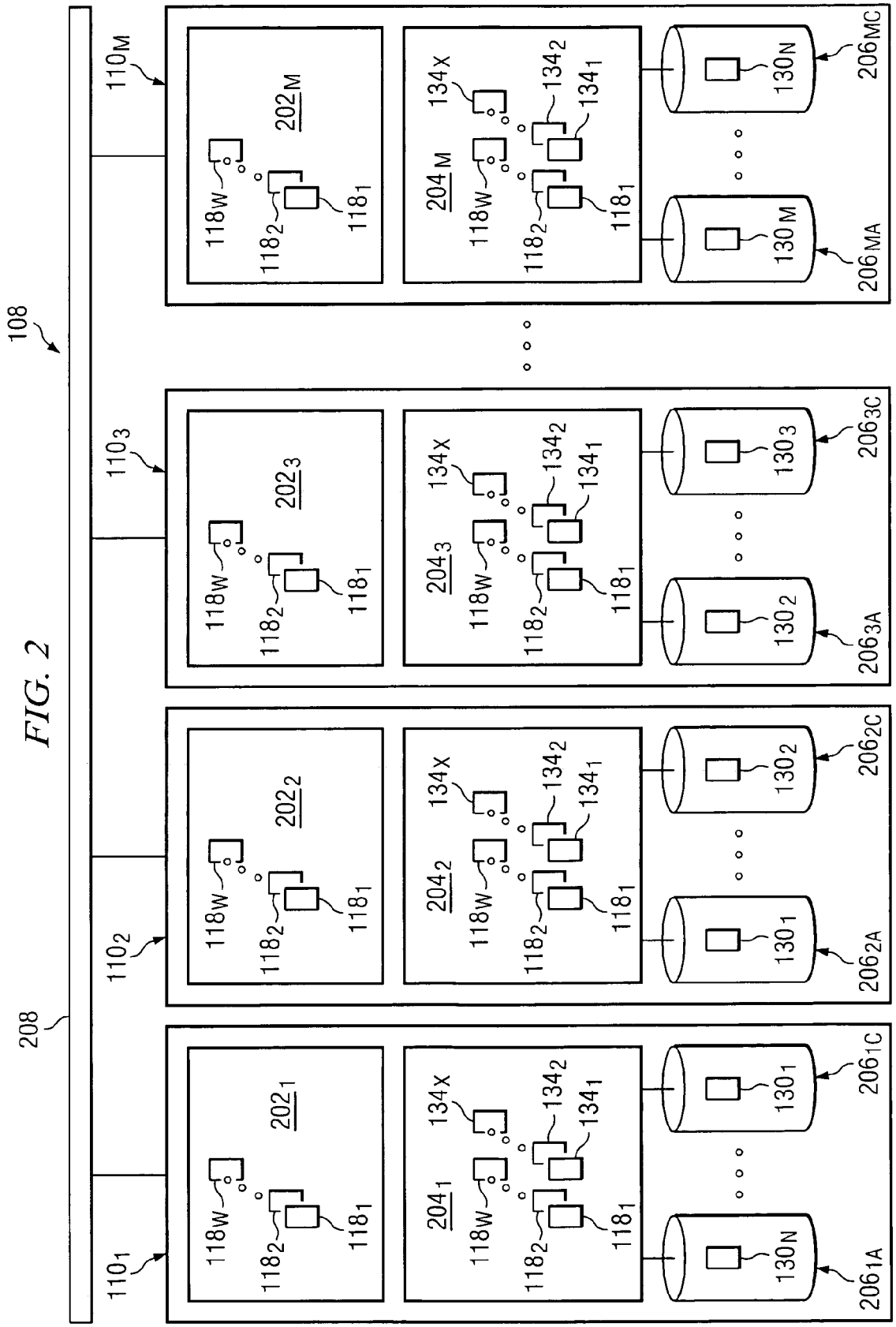
FIG. 2 is a block diagram of one embodiment of a database system capable of dynamically creating keys associated with a pre-compiled query.

FIG. 2 is a block diagram of one embodiment of a database system 108 capable of dynamically creating keys associated with one or more pre-compiled queries $118_1$-$118_W$. In this example, database system 108 operates to store pre-compiled queries $118_1$-$118_W$, rows $130_1$-$130_N$, and one or more dynamically created keys $134_1$-$134_X$ associated with one or more pre-compiled queries $118_1$-$118_W$. Moreover, database system 108 is capable of executing one or more pre-compiled queries $118_1$-$118_W$ upon receiving a request to execute a pre-compiled query 118 from a user of system 108. In this particular embodiment, each of pre-compiled queries $118_1$-$118_W$ comprises an annotated execution graph, one or more DLL's, and/or one or more software files.

In this particular embodiment, each of pre-compiled queries $118_1$-$118_W$ is capable of resolving one or more routine and/or standard data requests that may have variations in input variables. For example, pre-compiled query $118_2$ may be capable of returning one or more desired addresses or range of addresses when any combination of one or more first names, one or more last names, or one or more social security numbers are provided to database system 108, while pre-compiled query $118_1$ may be capable of returning a first name, last name, and state of registration, for all owners of one or more specific make, model, year, and/or color of one or more vehicles. One aspect of this disclosure recognizes that, in certain embodiments, deploying pre-compiled queries $118_1$-$118_W$ can increase the processing efficiency of database system 108 for routine and/or standard data requests that have a number of variations on the input parameters.

In this example, database system 108 comprises a parallel-processing database that includes a plurality of nodes $110_1$-$110_M$. Each of nodes $110_1$-$110_M$ of database system includes a master node 202, a slave node 204, and one or more memory modules 206. Although each of nodes $110_1$-$110_M$ includes master node 202, slave node 204, and one or more memory modules 206 in this example, each of nodes 110 may include any other appropriate device, or may exclude one or more of master node 202, slave node 204, or memory module 206 without departing from the scope of the present disclosure. In this particular embodiment, the number of master nodes 202 is the same as the number of slave nodes 204. In some embodiments, the number of slave nodes 204 can be larger than the number of master nodes 202. In other embodiments, the number of master nodes 202 can be larger than the number of slave nodes 204.

System 108 deploys pre-compiled queries $118_1$-$118_W$ on master node $202_1$. Although pre-compiled queries $118_1$-$118_W$ are deployed on master node $202_1$ in this example, the pre-compiled queries can be deployed on any one or all of master nodes $202_2$-$202_M$ without departing from the scope of the present disclosure. In other embodiments, system 108 can deploy each of pre-compiled queries $118_1$-$118_W$ on each of master nodes $202_1$-$202_M$. In this example, master node $202_1$ distributes a copy of pre-compiled queries $118_1$-$118_W$ to each of the other master nodes $202_2$-$202_M$ and to each of slave nodes $204_1$-$204_M$. In some embodiments, master node $202_1$ can distribute a copy of the one or more DLL's and/or one or more helper files associated with each of pre-compiled queries $118_1$-$118_W$ to slave nodes $204_1$-$204_M$.

In this example, each of master nodes $202_1$-$202_M$ is capable of executing each of pre-compiled queries $118_1$-$118_W$ upon receiving a request from a user of system 108. Moreover, each of master nodes $202_1$-$202_M$ is capable of reading the annotated query execution graph corresponding to a particular pre-compiled query $118_1$-$118_W$. In some embodiments, a particular master node 202 can determine that a particular pre-compiled query 118 can be fully executed on the master node 202. In other embodiments, a particular master node 202 can determine that a particular pre-compiled query 118 calls for the interaction of one or more slave nodes $204_1$-$204_M$. In some embodiments, the particular master node 202 can determine that the annotated query execution graph calls for the interaction of substantially all of slave nodes $204_1$-$204_M$.

Each master node $202_1$-$202_M$ is further capable of communicating one or more requests to perform substantially all or a portion of the actions associated with a particular pre-compiled query 118 to one or more slave nodes $204_1$-$204_M$ (e.g., on the same or on different node 110 as the master node) for processing in accordance with one or more of pre-compiled queries $118_1$-$118_W$. Master nodes $202_1$-$202_M$ may comprise any device or combination of devices that may include one or more hardware, software, and/or firmware modules. In this particular embodiment, each master node $202_1$-$202_M$ includes or has access to a memory that stores each pre-compiled query $118_1$-$118_W$ deployed on system 108.

In this particular embodiment, each of master nodes $202_1$-$202_M$ is capable of assisting in the dynamic creation of one or more keys $134_1$-$134_X$ for use by one or more pre-compiled queries $118_1$-$118_W$. In some embodiments, each of master nodes $202_1$-$202_M$ may be capable of assisting in the dynamic creation of one or more keys $134_1$-$134_X$ for use by one or more pre-compiled queries $118_1$-$118_W$ after such pre-compiled queries $118_1$-$118_W$ have been executed on system 108 for a particular number of times. In this particular embodiment, each of master nodes $202_1$-$202_M$ can assist in the dynamic creation of one or more keys $134_1$-$134_X$ for use by one or more pre-compiled queries $118_1$-$118_W$ after such pre-compiled queries $118_1$-$118_W$ have been executed on system 108 for a period of time, such as, for example for three minutes, a week, or any other appropriate period of time.

In some embodiments, one or more master nodes 202 may be capable of collecting one or more usage statistics after execution of pre-compiled queries $118_1$-$118_W$ for a period of time on system 108. In various embodiments, each master node $202_1$-$202_M$ can process a thread for each of pre-compiled queries $118_1$-$118_W$, such thread can operate to cause such master node 202 to request the usage statistics for pre-compiled queries $118_1$-$118_W$ after a period of time. In other embodiments, particular master nodes $202_1$-$202_M$ can be assigned to request the usage statistics for particular pre-compiled queries $118_1$-$118_W$ after a period of time. In most cases, when a particular master node 202 requests such usage statistics for one or more pre-compiled queries $118_1$-$118_W$, such master node 202 communicates a message to the remaining master nodes $202_1$-$202_M$ indicating that such master node 202 is processing the usage statistics and that it is not necessary for the other master nodded $202_1$-$202_M$ to process such usage statistics.

In most cases, the usage statistics are associated with requests received by system 108 and one or more particular pre-compiled queries 118 during a specified period. In various embodiments, the usage statistics can identify the combination of variables most practiced or used during execution of one or more particular pre-compiled queries 118 by each of slave nodes $204_1$-$204_M$ over a period of time. In some embodiments, the usage statistics can identify the variables provided in each request to execute a particular pre-compiled query 118. In other embodiments, the usage statistics can identify the combination of variables most practiced or used by master nodes $202_1$-$202_M$ upon receiving requests to execute one or more particular pre-compiled queries 118 from users of system 108 over a period of time. In this particular example, master node $202_1$ operates to identify the most practiced or used combinations of variables associated with one or more particular pre-compiled queries 118 executed on each of slave nodes $202_1$-$202_M$ over a particular period. In some embodiments, master node $202_1$ can identify the most practiced or used combinations of variables by, for example, tallying or computing the number of times particular combinations of variables were used by one or more particular pre-compiled queries 118.

In this particular embodiment, master node $202_1$, after processing the usage statistics, communicates a request to each slave node $204_1$-$204_M$ to create one or more keys $134_1$-$134_X$ for use by one or more pre-compiled queries 118. In this example, the request instructs each of slave nodes $204_1$-$204_M$ to create one or more keys $134_1$-$134_X$ that include the most practiced combinations of variables. In some cases, the request can instruct each of slave nodes $204_1$-$204_M$ to create, for example, one key, two keys, three keys, or more.

In this example, each of slave nodes $204_1$-$204_M$ is capable of storing each pre-compiled query 118 received from a particular master node 202. In addition, each of slave nodes $204_1$-$204_M$ is capable of executing each pre-compiled query 118 upon receiving a request from a particular master node 202. Slave nodes $204_1$-$204_M$ may comprise any device or combination of devices that may include one or more hardware, software, and/or firmware modules. In some cases, each of slave nodes $204_1$-$204_M$ may have access to and/or include one or more helper files that may assist each of slave nodes $204_1$-$204_M$ in executing a specific pre-compiled query 118.

In this particular embodiment, system 108 distributes rows $130_1$-$130_N$ approximately evenly over slave nodes $204_1$-$204_M$. In other embodiments, system 108 could distribute rows $130_1$-$130_N$ over slave nodes $204_1$-$204_M$ in any other suitable manner. In this example, each of slave nodes $204_1$-$204_M$ has access to one or more memory modules 206 capable of storing one or more rows 130 of data associated with a particular pre-compiled query 118. In other embodiments, each of slave nodes $204_1$-$204_M$ may include one or more memory modules 206. In this particular embodiment, each of slave nodes $204_1$-$204_M$ includes a memory that stores one or more helper files and/or one or more keys 134 associated with a particular pre-compiled query.

Memory modules 206 may include any hardware, software, firmware, or combination thereof operable to store and facilitate retrieval of information. Each memory module 206 may store information using any of a variety of data structures, arrangements, and/or compilations. Memory module 206 may, for example, include a hard disk, a dynamic random access memory (DRAM), a static random access memory (SRAM), or any other suitable volatile or nonvolatile storage and retrieval device or combination of devices.

In this example, each of slave nodes $204_1$-$204_M$ operates to store and/or provide access to rows 130 associated with at least another one of slave nodes $204_1$-$204_M$. For example, slave node $204_2$ operates to store and/or provide access to rows $130_1$ and $130_2$, while, slave node $204_3$ operates to store and/or provide access to rows $130_2$ and $130_3$. Thus, slave nodes $140_2$ and $140_3$ each provide access to data associated with rows $130_2$ and thereby add redundancy to system 108.

In this particular embodiment, each slave node $204_1$-$204_M$ is capable of assisting in the dynamic creation of one or more keys $134_1$-$134_X$ for use by one or more pre-compiled queries $118_1$-$118_W$. In some embodiments, each slave node $204_1$-$204_M$ may be capable of assisting in the dynamic creation of one or more keys $134_1$-$134_X$ for use by one or more pre-compiled queries $118_1$-$118_N$ after such pre-compiled queries 118 have been executed on system 108 for a particular number of times. In this particular embodiment, each slave node $204_1$-$204_M$ assists in the dynamic creation of one or more keys $134_1$-$134_X$ for use by one or more pre-compiled queries $118_1$-$118_N$ after such pre-compiled queries 118 have been executed on system 108 for a period of time. Moreover, each slave node $204_1$-$204_M$ assists in routinely updating and/or replacing the one or more of keys $134_1$-$134_X$ with one or more new keys $134_1$-$134_X$ after such pre-compiled queries 118 have been executed on system 108 for another period of time.

In various embodiments, each of slave nodes $204_1$-$204_M$ can determine the keys that would have been helpful in resolving a particular request to execute a particular pre-compiled query 118. In this particular embodiment, each of slave nodes $204_1$-$204_M$ operates to track and/or store one or more usage statistics each time a particular pre-compiled query 118 is executed on such slave node 204. In some cases, the usage statistics can comprise, for example, the particular combinations of variables used to resolve a particular pre-compiled query 118 on a particular slave node 204. In other cases, the usage statistics can identify which particular variables associated with a request matched the data stored in the one or more rows $130_1$-$130_N$. Moreover, each of slave nodes $204_1$-$204_M$ operates to communicate the usage statistics to a particular master node 202 upon receiving a request for such statistics.

In this particular embodiment, each of slave nodes $204_1$-$204_M$ routinely updates and/or replaces the one or more keys $134_1$-$134_X$ that are used to process one or more pre-compiled queries 118. Consequently, each of slave nodes $204_1$-$204_M$ operates to store those keys $134_1$-$134_X$ that are currently the most practiced or used to process one or more pre-compiled queries 118. In various embodiments, keys $134_1$-$134_X$ associated with a particular period of operation of system 108 can be accessible to and/or stored on each of slave nodes $204_1$-$204_M$. In some embodiments, keys $134_1$-$134_X$ can be stored on one or more storage modules 206 accessible to a particular slave node 204. In this particular embodiment, keys $134_1$-$134_X$ are stored on each of slave nodes $204_1$-$204_M$ in Random Access Memory (RAM). In various embodiments, each of keys $134_1$-$134_X$ can comprise one or more arrays of pointers that identify the location of particular data within database system 108.

In this example, a network 208 couples each of nodes 110 to each other. Network 208 may comprise any wireless network, wireline network, or combination of wireless and wireline networks capable of supporting communication between network elements. For example, network 208 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. In various embodiments, network 208 is capable of transmitting information from master nodes $202_1$-$202_M$ to one or more slave nodes $204_1$-$204_M$ over a plurality of communication channels.

In operation, database system 108 deploys one or more pre-compiled queries $118_1$-$118_W$ and a plurality of rows $130_1$-$130_N$ necessary to resolve pre-compiled queries $118_1$-$118_W$ to nodes $110_1$-$110_M$. In this particular embodiment, system 108 distributes and stores each of pre-compiled queries $118_1$-$118_W$ on each of master nodes $202_1$-$202_M$ and slave nodes $204_1$-$204_M$. Database system 108 also executes one or more of pre-compiled queries $118_1$-$118_W$ upon receiving a request to execute a particular pre-compiled query 118 from a user of system 108. In some cases, the request to execute a particular pre-compiled query can be received by database system 108 from client 102. In various embodiments, a user can request execution of a particular pre-compiled query 118 by connecting to system 108 through any appropriate means, such as through a host coupled to system 108.

In one particular example, system 108 receives a plurality of requests from one or more users to execute pre-compiled query $118_2$. In that example, pre-compiled query $118_2$ operates to return all vehicle owners having a specific first name, such as Richard, when any combination of one or more years a vehicle was produced, one or more vehicle makes, one or more vehicle models, one or more vehicle colors, one or more states of vehicle registration, one or more vehicle suggested retail prices, and one or more zip codes that a vehicle was sold in of vehicle is supplied in a request to system 108.

In one particular non-limiting example, a first user of system 108 provides a first request that seeks to have pre-compiled $118_2$ return all vehicle owners having the first name of Richard for all HONDA PRELUDES built between 1994 and 1998. A second user of system 108 provides a second request that seeks to have pre-compiled query $118_2$ return all vehicle owners having the first name of Bill for all FORDS built between 1935 and 1942. A third user of system 108 provides a third request that seeks to have pre-compiled query $118_2$ return all vehicle owners having the first name of Joe for all BMW Z8's. In this example, first user, second user, and third user all provide their respective requests during a first period of operation of system 108. In this example, system 108 also receives requests to execute others of pre-compiled queries $118_1$-$118_W$ during the first period of operation of system 108.

In most cases, system 108 selects only one of master nodes $202_1$-$202_M$ to receive the request from the user and to execute the particular pre-compiled query 118 that resolves the user's request. In one particular non-limiting example, system 108 selects master node $202_1$ to process the first request from the first user, and selects master node $202_2$ to process the second request from the second user. Furthermore, system 108 selects master node $202_3$ to process the third request from the third user. Although system 108 selected master nodes $202_1$-$202_3$ to process the requests in this example, any of master nodes $202_1$-$202_M$ could receive and process the request without departing from the scope of the present disclosure.

In this example, each of master nodes $202_1$-$202_3$ reads the annotated query execution graph of pre-compiled query $118_2$ and determines whether any of the activities associated with pre-compiled query $118_2$ require a remote activity. In some embodiments, each of master nodes $202_1$-$202_3$ determines that pre-compiled query $118_2$ can be fully executed each of master nodes $202_1$-$202_3$. In other embodiments, each of master nodes $202_1$-$202_3$ can determine that pre-compiled query $118_2$ calls for one or more remote activities and the interaction of substantially all slave nodes $204_1$-$204_M$. The remote activities can comprise, for example, an index read, a record read, an aggregation, a deduping, or any other activity that calls for the use of one or more slave nodes 204. In some cases, each of master nodes $202_1$-$202_3$ can determine whether the annotated query graph calls for a remote activity by the unique identification assigned to each activity for pre-compiled query $118_2$ by configuration tool 107 of FIG. 1.

In this particular example, each of master nodes $202_1$-$202_3$ reads the annotated query execution graph associated with pre-compiled query $118_2$ and determines that pre-compiled query $118_2$ is to be substantially executed on each of slave nodes $204_1$-$204_M$. Each of master nodes $202_1$-$202_3$ communicates a request to each of slave nodes $204_1$-$204_M$ to execute pre-compiled query $118_2$ for each of the first, second, and third requests. Each of slave nodes $204_1$-$204_M$ executes pre-compiled query $118_2$ and identifies the desired data to resolve the first, second, and third requests. In this example, each of slave nodes $204_1$-$204_M$ identifies all vehicle owners having the first name of Richard for all HONDA PRELUDES built between 1994 and 1998. In addition, each of slave nodes $204_1$-$204_M$ identifies all vehicle owners having the first name of Bill for all FORDS built between 1935 and 1942. Furthermore, each of slave nodes $204_1$-$204_M$ identifies all vehicle owners having the first name of Joe for all BMW Z8's.

In this example, after executing pre-compiled query $118_2$ and identifying the desired data, each of slave nodes $204_1$-$204_M$ returns a copy of the desired data to the respective master node 202 that generated the request for further processing according to the query execution graph of pre-compiled query $118_2$. For example, each of slave nodes $204_1$-$204_M$ returns a copy of the desired data for the first request to master node $202_1$, while each of slave nodes $204_1$-$204_M$ returns a copy of the desired data for the third request to master node $202_3$. In some cases, the desired data returned can include additional information, such as, for example, the last name and address of the vehicle owners, or any other appropriate information.

In this particular example, each of slave nodes $204_1$-$204_M$ identifies and stores one or more usage statistics relating to each of first, second, and third requests. The usage statistics identify the particular combinations of variables used to resolve the first, second, and third requests to execute pre-compiled query $118_2$ on each of slave nodes $204_1$-$204_M$. In this example, the usage statistics identify that the variables the maker of the vehicle, model of the vehicle, and the year the vehicle was produced were used to process the first request. While the variables the maker of the vehicle and the year the vehicle was produced were used to process the second request. The usage statistics also identify that the variables the maker of the vehicle and the model of the vehicle were used to process the third request. In other embodiments, each of slave nodes $204_1$-$204_M$ can identify and store one or more usage statistics relating to the execution of others of pre-compiled queries $118_1$-$118_W$ during the first period of operation of system 108.

In this particular example, after expiration of the first period of operation of system 108, master node $202_5$ requests that all slave nodes $204_1$-$204_M$ communicate their respective usage statistics. In this example, the first period of operation expired after system 108 processed the entire first, second, and third requests. Although in this example master node $202_5$ requests the usage statistics from each of slave nodes, any of master nodes $202_1$-$202_M$ can request the usage statistics for a particular pre-compiled query without departing from the scope of the present disclosure.

In this non-limiting example, master node $202_5$ computes the number of times particular combinations of variables were used to process a request using pre-compiled query $118_2$. In this example, master node $202_5$ determines the most practiced and/or used combination of variables associated with pre-compiled query $118_2$ during the first period of operation. Master node $202_5$ identifies that each of slave nodes $204_1$-$204_M$ used the combination of maker and year two times, used the combination of maker and model two times, and used the combination of maker, model, and year one time. In other embodiments, master node $202_5$ can also computes the number of times particular combinations of variables were used to process the requests to execute others of pre-compiled queries $118_1$-$118_W$. In those embodiments, master node $202_5$ could identify that each of slave nodes $204_1$-$204_M$ used the combination of maker and year five times, used the combination of maker and model seven times, and used other combinations one time or less.

In this example, master node $202_5$ communicates one or more requests to each of slave nodes $204_1$-$204_M$ to create two keys for use in processing requests associated with pre-compiled query $118_2$. In other embodiments, the two keys can be used in processing requests associated with others of pre-compiled queries $118_1$-$118_W$. The first key $134_1$ including the combination of vehicle maker and year the vehicle was produced, and the second key $134_2$ including the combination of the maker of the vehicle and the model of the vehicle. The one or more requests to each of slave nodes $204_1$-$204_M$ results in the formation of keys $134_1$ and $134_2$ on each of slave nodes $204_1$-$204_M$. In this particular embodiment, system 108 uses each of keys $134_1$ and $134_2$ during at least a second period of operation. Although this example creates two keys 134, any other appropriate number of keys can be created without departing from the scope of this disclosure.

In this particular example, after expiration of the second period of operation and all subsequent periods of operation of system 108, one of master node $202_1$-$202_M$ requests that all slave nodes $204_1$-$204_M$ communicate their respective usage statistics for pre-compiled query $118_2$ and/or other pre-compiled queries 118. The particular master node 202 that requests the usage statistics, computes the number of times particular combinations of variables were used to process a request using pre-compiled query $118_2$ and/or other pre-compiled queries 118 during the particular time period. Moreover, the particular master node 202 communicates one or more requests to each of slave nodes $204_1$-$204_M$ to create one or more keys that include the most practiced and/or used combinations of variables for pre-compiled query $118_2$ and/or other pre-compiled queries 118 during that particular period. The one or more requests to each of slave nodes $204_1$-$204_M$ results in the creation and/or modification of keys $134_1$-$134x$ on each of slave nodes $204_1$-$204_M$.

Figure 3A:
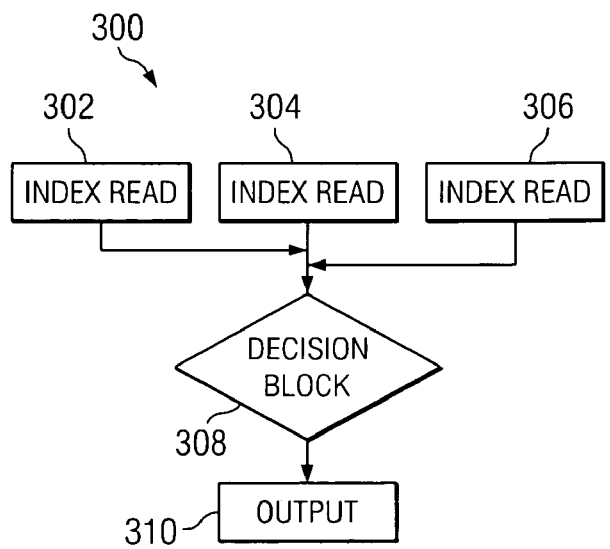
FIGS. 3A and 3B are a block diagram of example embodiments of query execution graphs associated with an example pre-compiled query.
Figure 3B:
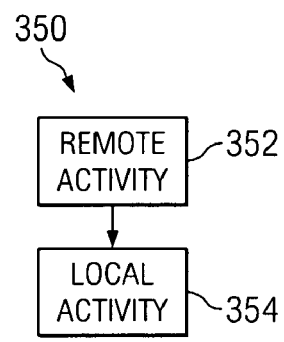

FIGS. 3A and 3B illustrate exemplary embodiments of query execution graphs associated with particular pre-compiled queries 118. FIGS. 3A and 3B illustrate two example embodiments of query execution graphs. It should be appreciated that other embodiments of a query execution graph may be used without departing from the scope of the present disclosure.

FIG. 3A is a block diagram of one embodiment of a query execution graph 300 associated with an example pre-compiled query. In this example, query execution graph 300 includes five activities 302-310. Although query execution graph 300 includes five activities 302-310 in this example, query execution graph 300 could include any other number of activities without departing from the scope of the present disclosure.

In various embodiments, query execution graph 300 includes activities 302-306, each capable of providing one or more desired responses or ranges of responses upon receiving a set of input variables. Activities 302-306 can comprise, for example, remote activities, local activities, and/or a combination of remote and local activities. As used throughout this document, the term "remote activity" or "remote activities" refers to a particular activity within a pre-compiled query that calls for the execution of at least a portion of that activity on one or more slave nodes. A "local activity" is a particular activity within a pre-compiled query that is executed on the master node processing the pre-compiled query.

In this particular embodiment, each of activities 302-306 comprises one or more remote activities, such as, for example, one or more index reads, one or more record reads, one or more aggregations, or any other activity that necessitates the use of one or more slave nodes. Moreover, each of activities 302-306 has access to one or more associated DLL's and/or helper files capable of assisting a master node 202 or slave node 204 in processing the one or more remote activities associated with activities 302-306.

In this example, activities 308-310 comprise one or more local activities, such as, for example, a one or more sorts, one or more deduping, one or more roll ups, or any other activity capable of being performed on the master node that received the request. Each of activities 308-310 has access to one or more associated DLL's and/or helper files capable of assisting a master node 202 in processing the one or more local activities associated with activities 308-310.

In one non-limiting example, query execution graph 300 illustrates a pre-compiled query capable of returning one or more desired addresses or range of addresses when any combination of first name, last name, or social security number is provided by a user of a database system, such as system 108 of FIG. 1. In that example, activity 302 is capable of returning one or more desired addresses or range of addresses when a user inputs a first name and last name, while activity 304 is capable of returning one or more desired addresses or range of addresses when a user inputs a social security number. Moreover, activity 306 is capable of returning one or more desired addresses or range of addresses when a user inputs a last name.

In that example, activity 308 operates to determine which inputs have been provided by the user and to select an appropriate one of activities 302-306 to resolve the user's request. In various embodiments, activity 308 includes or has access to logic that enables activity 308 to determine the best activity 302-306 to use in resolving the user's request. In some cases, activity 308 can include logic that determines the probability of each activity 302-306 returning the desired address based on the inputs and selects the activity with the highest probability. For example, the logic could indicate that when a social security number and a last name are provided, implementing activity 304 is most likely to return the desired address. In this example, activity 310 operates to provide an output signal that includes the desired address to the user.

FIG. 3B is a block diagram of one embodiment of a query execution graph 350 associated with an example pre-compiled query 118. In this example, query execution graph 350 includes two activities 352-354. Although query execution graph 350 includes two activities 352-354 in this example, query execution graph 350 could include any other number of activities without departing from the scope of the present disclosure.

In various embodiments, query execution graph 350 includes activity 352 that is capable of providing one or more desired responses or range of responses upon receiving a certain set of input variables. Activity 352 can comprise, for example, one or more remote activities, one or more local activities, and/or a combination of remote and local activities.

In this particular embodiment, activity 352 comprises one or more remote activities, such as, for example, one or more index reads, one or more record reads, one or more aggregations, or any other activity that necessitates the use of one or more slave nodes. Moreover, activity 352 has access to one or more associated DLL's and/or helper files capable of assisting a master node 202 or slave node 204 in processing the one or more remote activities associated with activity 352.

In this example, activity 354 comprise one or more local activities, such as, for example, one or more sorts, one or more deduping, one or more roll ups, or any other activity capable of being performed on the master node that received the request. Activity 354 has access to one or more associated DLL's and/or helper files capable of assisting a master node 202 in processing the one or more local activities associated with activity 354.

In one non-limiting example, query execution graph 350 illustrates a pre-compiled query capable of returning one or more desired responses or ranges of responses when any combination of variables are received in a request from a user. For example, such pre-compiled query may be capable of returning all vehicle owners having a specific first name, such as Richard, when any combination of one or more years a vehicle was produced, one or more vehicle makes, one or more vehicle models, one or more vehicle colors, one or more states of vehicle registration, one or more vehicle suggested retail prices, and one or more zip codes that a vehicle was sold in of vehicle is supplied in a request to a database system, such as system 108. In that example, activity 352 is capable of returning all vehicle owners having the first name of Richard when a user inputs any combination of the seven or more variables. In that example, activity 354 operates to provide one or more output signals that include the one or more desired responses or range of responses.

FIG. 4 is one embodiment of a table 400 that includes a plurality of rows $430_1$-$430_N$. FIG. 4 illustrates just one example embodiment of a table capable of being distributed over a plurality of nodes, such as slave nodes $204_1$-$204_M$ of FIG. 1. It should be appreciated that other embodiments of a table may be used without departing from the scope of the present disclosure. In this example, table 400 includes seven fields 402-414. Although table 400 include seven fields 402-414 in this example, table 400 could include any other number of fields without departing from the scope of the present disclosure.

In this example, a database system is capable of generating fields 402-414 and distributing rows $430_1$-$430_M$ over a plurality of nodes, such as slave nodes $204_1$-$204_M$ of FIG. 2. In some cases, fields 402-414 of table 400 can be populated with data generated by and/or stored on a database system, such as database system 108 of FIG. 2. In various embodiments, table 400 can be generated in response to a database system receiving a query, such as query representation 132 or compiled query 116 of FIG. 1. In this particular embodiment, table 400 is generated in response to receiving a query capable of returning one or more desired responses or ranges of responses when a user of a database provides any combination of the seven of variables.

In one non-limiting example, table 400 is generated in response to receiving a query capable of returning the first name, last name, and state of registration of all owners of a specific make, model, year, and color of a vehicle. In that example, table 400 includes a first field 402 that includes the maker of the vehicle, second field 404 includes the model of the vehicle, and third field 406 that includes the year the vehicle was manufactured. In this example, fourth field 408 includes the color of the vehicle, fifth field 410 includes the first name of the owner of the vehicle, sixth field 412 includes the last name of the owner of the vehicle, and seventh field 414 includes the state of registration of the vehicle. Although this example includes certain variables in fields 402-414, any other variables may be used without departing from the scope of the present disclosure. In this example, each of rows $430_1$-$430_N$ is distributed over a plurality of slave nodes $204_1$-$204_M$ for use by system 108 of FIG. 2. Moreover, each of rows $430_1$-$430_N$ is stored in Random Access Memory accessible to each of the plurality of slave nodes $204_1$-$204_M$.

FIGS. 5A and 5B are example embodiments of a plurality of keys 534 associated with a table, such as table 400 of FIG. 4, that were dynamically created by a database system. Each of FIGS. 5A and 5B illustrates just one example embodiment of a plurality of keys associated with a table that were dynamically created. It should be appreciated that other embodiments of dynamically created keys may be used without departing from the scope of the present disclosure. In this example, each key 534a-534d includes three fields. Although keys 534a-534d include three fields in this example, keys 534a-534d could include any other number of fields without departing from the scope of the present disclosure.

In various embodiments, keys 534a-534d can be dynamically created in response to a database system executing one or more particular pre-compiled queries a number of time, such as, for example, after the one or more particular pre-compiled queries were executed five times, fifty times, two-hundred times, or more. In other embodiments, keys 534a-534d can be dynamically created after one or more particular pre-compiled queries have been executed for a period of time, such as, for example, after three minutes, after one hour, after one day, after a week, or after any other appropriate period of time. In this particular embodiment, keys 534a-534d are dynamically created in response to executing one or more particular pre-compiled queries after a period of time. In that embodiment, at least one of the particular pre-compiled queries is capable of returning one or more desired responses or ranges of responses when a user of a database provides any combination of variables.

In these particular examples, each of keys 534a-534d is stored in Random Access Memory (RAM) associated with each slave node, such as slave nodes $204_1$-$204_M$ of FIG. 2. Moreover, each of keys 534a-534d comprises an array of pointers that enables the database system to identify the location of particular portions of data relatively quickly. In some embodiments, each of keys 534a-534d comprises a sorted array of pointers. In various embodiments, each of keys 534a-534d includes a plurality of records and/or data entries associated with the data stored on a particular slave node. In some cases, each of the records and/or data entries can comprise, for example, four bytes, eight bytes, or more. One aspect of this disclosure recognizes that dynamically creating one or more keys 534 for use in processing one or more pre-compiled queries can improve the processing efficiency and processing speed of the database system.

FIG. 5A illustrates an example embodiment of a plurality of keys 534 that were dynamically created during a first period of operation of a database system. In this example, key 534a includes three fields 502-506, while key 534b includes three fields 508-512. In this example, a database system, such as system 108 of FIG. 1, dynamically creates keys 534a and 534b after the database system has processed one or more particular pre-compiled queries for a first period of time. In some cases, fields 502-504 and 508-510 of keys 534a and 534b, respectively, can be populated with any of the variables of a table associated with one or more particular pre-compiled queries, such as fields 402-414 of table 400 of FIG. 4.

In one non-limiting example, keys 534a and 534b are generated in response to a database system executing a pre-compiled query capable of returning the first name, last name, and state of registration of all owners of a specific make, model, year, and color of a vehicle. In this example, each of keys 534a and 534b are sorted by first field 502. Although each of keys 534a and 534b are sorted by first field 502 in this example, keys 534a and 534b could be sorted by any other field without departing from the scope of the present disclosure. In this example, first field 502 of key 534a includes the years vehicles were manufactured, while first field 508 of key 534b includes the models of the vehicles. Second field 504 of key 534a includes the makers of the vehicles, while second field 510 of key 534b includes the colors of the vehicles. Third fields 506 and 512 of keys 534a and 534b, respectively, include a pointer capable of identifying the location of a particular entry or row associated with a table. The pointer can comprise, for example, a memory address for the particular entry or row stored on a particular slave node, such as slave nodes $204_1$-$204_M$ of FIG. 2.

FIG. 5B illustrates an example embodiment of a plurality of dynamically created keys 534 during a second period of operation of a database system, such as database system 108 of FIG. 1. In this example, key 534c includes three fields 514-518, while key 534d includes three fields 520-524. In this example, a database system dynamically creates keys 534c and 534d after the database system has processed one or more particular pre-compiled queries for a second period of time. In some cases, fields 514-516 and 520-522 of keys 534c and 534d, respectively, can be populated with any of the variables of the table associated with one or more particular pre-compiled queries, such as fields 402-414 of table 400 of FIG. 4.

In one non-limiting example, keys 534c and 534d are generated in response to a database system executing a pre-compiled query capable of returning the first name, last name, and state of registration of all owners of a specific make, model, year, and color of a vehicle. In this example, each of keys 534c and 534d are sorted by first field 514. Although each of keys 534c and 534d are sorted by first field 514 in this example, keys 534c and 534d could be sorted by any other field without departing from the scope of the present disclosure. In this example, first field 514 of key 534c includes the states of registration of the vehicles, while first field 520 of key 534b includes the models of the vehicles. Second field 516 of key 534a includes the years the vehicles were manufactured, while second field 522 of key 534b includes the years the vehicles were manufactured. Third fields 518 and 524 of keys 534a and 534b, respectively, include a pointer capable of identifying the location of a particular entry or row associated with a table. The pointer can comprise, for example, a memory address for the particular entry or row stored on a particular slave node, such as slave nodes $204_1$-$204_M$ of FIG. 2.

In this example, each of keys 534a-534d operates to identify the location within a database system of the data necessary to resolve a request from a user. In some embodiments, a request from the user can match each of the variables associated with a particular key 534. In other embodiments, a request from the user can match only one or some of the variables associated with a particular key 534. In various embodiments, the dynamically created keys 534a-534d can comprise the most requested combinations of variables associated with one or more particular pre-compiled queries executed on a database system during a specified period. In this example, the database system creates the two most requested combinations of variables during a specified period as keys 534. Although the database system in this example creates only the two most requested combinations of variables as keys, any other number of keys may be created without departing from the scope of the present disclosure. In some embodiments, keys 534a-534d may be capable of identifying the memory address of the data capable of resolving one or more particular requests. In some cases, the memory address can be associated with a particular slave node, such as one of slave nodes $204_1$-$204_M$ of FIG. 2.

In this particular example, the database system dynamically creates the two most requested combinations of variables as keys 534a and 534b during a first time period for use in processing one or more particular pre-compiled queries. Moreover, the database system dynamically creates the two most requested combinations of variables as keys 534c and 534d during a second time period for use in processing the one or more particular pre-compiled queries. In some cases, keys 534c and 534d can be the same as keys 534a and 534b. In this example, after keys 534c and 534d are created, the database system operates to replace keys 534a and 534b with keys 534c and 534d on each of slave nodes $204_1$-$204_M$.

Although this example includes only two time periods, any other number of time periods may be used without departing from the scope of the present disclosure.

Figure 6:
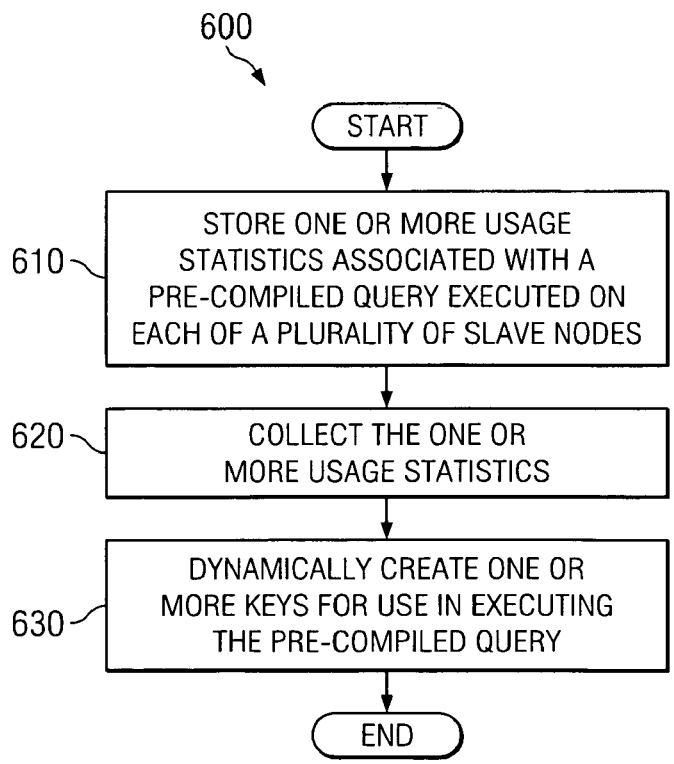
FIG. 6 is a flow chart illustrating an exemplary method for dynamically creating keys in a database system.

FIG. 6 is a flow chart illustrating an exemplary method 600 for dynamically creating keys in a database system. In one particular embodiment, a database system may dynamically create one or more keys by using system 108 of FIG. 2. Although system 108 is used in this example, other systems may be used without departing from the scope of the present disclosure. In this embodiment, system 108 stores one or more pre-compiled queries $118_1$-$118_W$ and a plurality of rows $130_1$-$130_N$ necessary to resolve each pre-compiled queries $118_1$-$118_W$ to on each of master nodes $202_1$-$202_M$ and slave nodes $204_1$-$204_M$.

In this example, one or more users of system 108 generate a plurality of requests (e.g., ten) to execute one or more particular pre-compiled queries 118, such as pre-compiled query $118_2$. In that example, pre-compiled query $118_2$ operates to return all vehicle owners having a specific first name, when any combination of one or more years a vehicle was produced, one or more vehicle makes, one or more vehicle models, one or more vehicle colors, one or more states of vehicle registration, one or more vehicle suggested retail prices, and one or more zip codes that a vehicle was sold in of vehicle is supplied in a request to system 108. Although pre-compiled query $118_2$ is used in this example, any one or all of pre-compiled queries $118_1$-$118_W$ could be executed without departing from the scope of the present disclosure.

In this example, system 108 selects master nodes $202_1$-$202_{10}$ to receive and process the plurality of requests from the one or more users. In this example, each of master nodes $202_1$-$202_{10}$ receives one of the ten requests received from the one or more users of system 108. Although system 108 selected master nodes $202_1$-$202_{10}$ to process the plurality of requests in this example, any of master nodes $202_1$-$202_M$ could receive and process the requests without departing from the scope of the present disclosure.

In this example, each of master nodes $202_1$-$202_{10}$ reads the annotated query execution graph of pre-compiled query $118_2$ and determines that pre-compiled query $118_2$ is to be substantially executed on each of slave nodes $204_1$-$204_M$. Each of master nodes $202_1$-$202_{10}$ communicate a request to each of slave nodes $204_1$-$204_M$ to execute pre-compiled query $118_2$ for each of the plurality of requests received from the one or more users of system 108. Each of slave nodes $204_1$-$204_M$ executes pre-compiled query $118_2$ and identifies the desired data to resolve the plurality of requests.

In this example, each of slave nodes $204_1$-$204_M$ identifies all vehicle owners having specific first names for a particular combination of input variables. For example, each of slave nodes $204_1$-$204_M$ resolves the first request by identifying all vehicle owners having the first name of Richard for all HONDA PRELUDES built between 1994 and 1998. In addition, each of slave nodes $204_1$-$204_M$ resolves the eighth request by identifying all vehicle owners having the first name of Frank for all yellow FORDS built between 1935 and 1942.

In this example, after executing pre-compiled query $118_2$ and identifying the desired data, each of slave nodes $204_1$-$204_M$ returns a copy of the desired data to the respective master node 202 that generated the request for further processing according to the query execution graph of pre-compiled query $118_2$. For example, each of slave nodes $204_1$-$204_M$ returns a copy of the desired data for the first request to master node $202_1$, while each of slave nodes $204_1$-$204_M$ returns a copy of the desired data for the eighth request to master node $202_8$. In some cases, the desired data returned can include additional information, such as, for example, the last name and address of the vehicle owners, or any other appropriate information. Although this example executes pre-compiled query $118_2$ on each of slave nodes $204_1$-$204_M$, any one or all of pre-compiled queries $118_1$-$118_W$ could be executed without departing from the scope of the present disclosure.

In this example, method 600 begins at step 610 where each of slave nodes $204_1$-$204_M$ store one or more usage statistics associated with pre-compiled query $118_2$. Although the usage statistics are associated with pre-compiled query $118_2$ in this example, the usage statistics could be associated with any one or all of pre-compiled queries $118_1$-$118_W$ without departing from the scope of the present disclosure. In this particular embodiment, each of slave nodes $204_1$-$204_M$ store one or more usage statistics each time pre-compiled query $118_2$ is executed on the particular slave node 204. In this particular example, each of slave nodes $204_1$-$204_M$ identifies and stores one or more usage statistics relating to each of the plurality of requests. The usage statistics identify the particular combinations of variables used to resolve each of the plurality of requests to execute pre-compiled query $118_2$ on each of slave nodes $204_1$-$204_M$. For example, the usage statistics identify that the variables the maker of the vehicle, model of the vehicle, and the year the vehicle was produced were used to process the first request. While the variables the color of the vehicle, the maker of the vehicle, and the years the vehicles were produced were used to process the eighth request.

Method 600 operates to collect the one or more usage statistics from each of slave nodes $204_1$-$204_M$ at step 620. In this particular example, after expiration of the first period of operation of system 108, master node $202_5$ requests that all slave nodes $204_1$-$204_M$ communicate their respective usage statistics. In this example, the first period of operation expired after system 108 processed each of the plurality of requests (e.g., ten) received from the one or more users. Although in this example master node $202_5$ requests the usage statistics from each of slave nodes, any of master nodes $202_1$-$202_M$ can request the usage statistics for a particular pre-compiled query without departing from the scope of the present disclosure.

In this non-limiting example, master node $202_5$ computes the number of times particular combinations of variables were used to process a request using pre-compiled query $118_2$. In other embodiments, master node $202_5$ can compute the number of times particular combinations of variables were used to process requests using one or more of pre-compiled queries $118_1$-$118_W$. In this example, master node $202_5$ determines the most practiced and/or used combinations of variables associated with pre-compiled query $118_2$ during the first period of operation. Master node $202_5$ identifies that each of slave nodes $204_1$-$204_M$ used the combination of maker and year six times, used the combination of model and color three times, used the combination of model and year five times, and used the combination of maker, model, and year two times.

In this example, master node $202_5$ communicates one or more requests to each of slave nodes $204_1$-$204_M$ to create three keys for use by at least pre-compiled query $118_2$. The first key $134_1$ including the combination of vehicle maker and year the vehicle was produced, the second key $134_2$ including the combination of the model of the vehicle and the color of the vehicle, and the third key $134_3$ including the combination of vehicle model and year the vehicle was produced. Although this example creates three keys 134, any other appropriate number of keys can be created without departing from the scope of this disclosure.

Method 600 operates to dynamically create the one or more keys to be used in executing pre-compiled query $118_2$ at step 630. The one or more requests to each of slave nodes $204_1$-$204_M$ results in the formation of keys $134_1$-$134_3$ on each of slave nodes $204_1$-$204_M$. In this particular embodiment, system 108 uses each of keys $134_1$-$134_3$ during at least a second period of operation. In other embodiments, keys $134_1$-$134_3$ created by each of slave nodes $204_1$-$204_M$ can be used in processing requests associated with one or more other pre-compiled queries $118_1$-$118_W$.

In this particular example, after expiration of the second period of operation and all subsequent periods of operation of system 108, one of master node $202_1$-$202_M$ requests that all slave nodes $204_1$-$204_M$ communicate their respective usage statistics for pre-compiled query $118_2$ and/or other pre-compiled queries 118. The particular master node 202 that requests the usage statistics, computes the number of times particular combinations of variables were used to process a request using pre-compiled query $118_2$ and/or other pre-compiled queries 118 during the particular time period. Moreover, the particular master node 202 communicates one or more requests to each of slave nodes $204_1$-$204_M$ to create one or more keys that include the most practiced and/or used combinations of variables for pre-compiled query $118_2$ and/or other pre-compiled queries 118 during that particular period. The one or more requests to each of slave nodes $204_1$-$204_M$ results in the creation and/or modification of keys $134_1$-$134x$ used on each of slave nodes $204_1$-$204_M$ during the prior period of operation.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A database system capable of dynamically creating one or more keys associated with one or more pre-compiled queries, the system comprising:

a query module operating to generate one or more pre-compiled queries from a query representation received from a client;

a plurality of slave nodes operating to execute the one or more pre-compiled queries, each of the plurality of slave nodes operating to track, as the one or more pre-compiled queries are executed over a time period, one or more usage statistics identifying variables used to resolve the pre-compiled queries on each slave node; and at least one master node coupled to each of the plurality of slave nodes, the at least one master node comprising a computer processor and operating to:

receive the one or more usage statistics from each of the plurality of slave nodes, compute, based on the respective usage statistics from each slave node, a number of times the identified variables were used as the pre-complied queries were executed over the time period, and, based at least in part on the number of times the identified variables were used during the time period, request the plurality of slave nodes to dynamically create one or more keys, the keys including pointers identifying locations of data on the slave nodes for resolving the pre-compiled queries;

wherein each of the plurality of slave nodes dynamically creates the one or more keys for use in executing the one or more pre-compiled queries.

2. The system of claim 1, wherein each of the plurality of slaves executes the one or more pre-compiled queries upon receiving a request to execute the one or more pre-compiled queries from the at least one master node.

3. The system of claim 1, wherein the at least one master node communicates a request to dynamically create one or more keys for use in executing the one or more pre-compiled queries to each of the plurality of slave nodes.

4. The system of claim 1, wherein the at least one master node identifies the one or more keys to dynamically create by identifying combinations of variables most used during execution of the one or more pre-compiled queries.

5. The system of claim 4, wherein the one or more usage statistics identify the combinations of variables used to resolve the one or more pre-compiled queries.

6. The system of claim 1, wherein the at least one master node identifies the one or more keys to dynamically create in response to the one or more pre-compiled queries being executed for a period of time on the database system.

7. The system of claim 1, wherein the at least one master node identifies the one or more keys to dynamically create in response to the one or more pre-compiled queries being executed a particular number of times on the database system.

8. The system of claim 1, wherein the at least one master node identifies another one or more keys to dynamically create based at least in part one or more usage statistics associated with another period of operation of the database system.

9. The system of claim 1, wherein the one or more keys are dynamically created while each of the plurality of slave nodes is capable of executing the one or more pre-compiled queries.

10. The system of claim 1, wherein at least some of the one or more pre-compiled queries are stored on the at least one master node and each of the plurality of slave nodes in advance of a user providing a data request to the database system.

11. The system of claim 1, wherein at least some of the one or more pre-compiled queries operates to resolve routine or standard data requests that are capable of having variations in input parameters or intermediate results.

12. The system of claim 1, wherein each of the plurality of slave nodes comprise one or more memory modules capable of storing one or more rows of data associated with a table.

13. The system of claim 1, wherein the one or more keys are stored in a Random Access Memory associated with each of the plurality of slave nodes.

14. The system of claim 1, wherein the pointers are stored as arrays.

15. The system of claim 1, further comprising a plurality of master nodes, each of the plurality of master nodes operable to receive the one or more usage statistics from each of the plurality of slave nodes and to identify one or more keys to dynamically create based at least in part on the one or more usage statistics.

16. A method of dynamically creating one or more keys associated with one or more pre-compiled queries for use on a database system, the method comprising:
    generating one or more pre-compiled queries from a query representation received from a client;
    tracking, as the one or more pre-compiled queries are executed on a plurality of slave nodes over a time period, one or more usage statistics identifying variables used to resolve the pre-compiled queries on each of the plurality of slave nodes;
    collecting, from each of the plurality of slave nodes, the one or more usage statistics associated with the one or more pre-compiled queries;
    computing a number of times the identified variables were used as the pre-compiled queries were executed over the time period based at least on the respective usage statistics from each slave node;
    based at least in part on the number of times the identified variables were used during the time period, requesting that the plurality of slave nodes dynamically create one or more keys, the keys including pointers identifying locations of data on the slave nodes for resolving the pre-compiled queries; and
    at each of the plurality of slave nodes, dynamically creating the one or more keys.

17. The method of claim 16, wherein the one or more usage statistics identify combinations of variables used to resolve the one or more pre-compiled queries.

18. The method of claim 16, wherein the one or more usage statistics are collected using the at least one master node coupled to each of the plurality of slave nodes.

19. The method of claim 16, wherein the one more keys are dynamically created in response to the one or more pre-compiled queries being executed for a period of time on each of the plurality of slave nodes.

20. The method of claim 16, wherein the one or more keys are stored in a Random Access Memory associated with each of the plurality of slave nodes.

21. The method of claim 16, wherein the pointers are stored as arrays.

22. The method of claim 16, wherein at least one of the one or more pre-compiled queries operates to resolve a routine data request that is capable of having variations in input parameters.

23. The method of claim 16, further comprising dynamically creating another one or more keys for use in executing the one or more pre-compiled queries, the dynamic creation of the another one or more keys based at least in part on the collection of the one or more usage statistics associated with another period of operation of the database system.

24. The method of claim 16, further comprising:
    distributing at least some of the one or more pre-compiled queries to a plurality of master nodes and each of the plurality of slave nodes in advance of a user providing a data request to the database system;
    receiving a request to execute at least one of the one or more pre-compiled queries from at least one master node;
    executing the pre-compiled query on each of the plurality of slave nodes; and
    communicating the one or more usage statistics to one of the plurality of master nodes upon receiving a request from the at least one master node.

25. The method of claim 16, further comprising:
    identifying the one or more keys to dynamically create based at least in part on the one or more usage statistics; and
    communicating a request to dynamically create the one or more keys to each of the plurality of slave nodes.

26. The method of claim 25, wherein at least one master node identifies the one or more keys to dynamically create by tallying the usage statistics and identifying one or more combinations of variables most used during execution of the one or more pre-compiled queries.

27. A computer-implemented system for dynamically creating one or more keys, comprising:
    one or more computer processors collectively operating to:

generate one or more pre-compiled queries from a query representation received from a client;

track, as the one or more pre-compiled queries are executed on a plurality of slave nodes over a time period, one or more usage statistics identifying variables used to resolve the pre-compiled queries on each of the plurality of slave nodes;

collect the one or more usage statistics associated with the one or more pre-compiled queries from each of the plurality of slave nodes;

compute a number of times the identified variables were used as the pre-compiled queries were executed over the time period based on the respective usage statistics from each slave node; and based at least in part on the number of times the identified variables were used during the time period, request that the plurality of slave nodes dynamically create one or more keys, the keys including pointers identifying locations of data on the slave nodes for resolving the pre-compiled queries;

wherein the plurality of slave nodes dynamically create one or more keys.

28. The database system according to claim 1, wherein at least one of the keys identifies a location that is external to the database system.

29. The database system according to claim 1, wherein at least one of the keys identifies a location that is a memory address within the database system.

30. The database system according to claim 1, wherein the at least one master node distributes the one or more pre-compiled queries to another master node within the database system.

31. The database system according to claim 1, wherein the at least one master node determines that one of the pre-compiled queries can be fully executed on the at least one master node.

32. The database system according to claim 1, wherein the at least one master node determines that one of the pre-compiled queries calls for the interaction of at least one of the plurality of slave nodes.

33. The database system according to claim 1, wherein the at least one master node communicates a message to another master node in the database system that the at least one master node is processing the usage statistics and that it is not necessary for the other master node to process the usage statistics.

* * * * *